(12) United States Patent
Vembu et al.

(10) Patent No.: US 11,323,401 B2
(45) Date of Patent: May 3, 2022

(54) EMAIL INTERFACE FOR APPLICATION CREATION AND MANAGEMENT

(71) Applicant: Zoho Corporation Private Limited, Pleasanton, CA (US)

(72) Inventors: Sridhar Vembu, Pleasanton, CA (US); Bharath Sridhar, Cupertino, CA (US); Sudheer A Grandhi, Pleasanton, CA (US)

(73) Assignee: Zoho Corporation Private Limited, Kanchipuram District (IN)

( * ) Notice: Subject to any disclaimer, the term of this patent is extended or adjusted under 35 U.S.C. 154(b) by 928 days.

(21) Appl. No.: 14/961,701

(22) Filed: Dec. 7, 2015

(65) Prior Publication Data

US 2016/0087930 A1    Mar. 24, 2016

Related U.S. Application Data

(63) Continuation-in-part of application No. 14/861,160, filed on Sep. 22, 2015, now abandoned.

(60) Provisional application No. 62/181,960, filed on Jun. 19, 2015, provisional application No. 62/089,034, filed on Dec. 8, 2014, provisional application No. 62/054,683, filed on Sep. 24, 2014.

(51) Int. Cl.
*H04L 12/58* (2006.01)
*H04L 12/26* (2006.01)
*H04L 29/08* (2006.01)
*H04L 51/18* (2022.01)

(52) U.S. Cl.
CPC .................................. *H04L 51/18* (2013.01)

(58) Field of Classification Search
CPC ...................................................... H04L 51/18
See application file for complete search history.

(56) References Cited

U.S. PATENT DOCUMENTS

| | | | |
|---|---|---|---|
| 5,671,428 | A  | 9/1997  | Muranaga et al. |
| 6,088,707 | A  | 7/2000  | Bates et al. |
| 6,623,529 | B1 | 9/2003  | Lakritz |
| 7,479,949 | B2 | 1/2009  | Jobs et al. |
| 7,680,895 | B2 | 3/2010  | Perlow et al. |
| 8,041,770 | B1 | 10/2011 | Schmidt |
| 8,232,990 | B2 | 7/2012  | King et al. |
| 8,514,221 | B2 | 8/2013  | King et al. |

(Continued)

FOREIGN PATENT DOCUMENTS

WO    2012125815 A2    9/2012

OTHER PUBLICATIONS

Non-final Office action in U.S. Appl. No. 15/008,818, dated Oct. 19, 2017, 8 pages.

(Continued)

*Primary Examiner* — Christopher B Robinson
(74) *Attorney, Agent, or Firm* — Arthur Behiel; Mark Lauer; Silicon Edge Law Group LLP

(57) ABSTRACT

A system and method for creating, managing, and using an application in a messaging environment is described. A communication including an application specification comprising zero or more commands is received from a sender and processed. The system and method determine whether the application specification is in a done condition, and iterates until done. A confirming specification, including revisions made while iterating, is also created and returned to the sender and recipients.

17 Claims, 7 Drawing Sheets

(56) References Cited

U.S. PATENT DOCUMENTS

| | | | |
|---|---|---|---|
| 8,645,872 B2 | 2/2014 | Maxfield et al. | |
| 8,766,928 B2 | 7/2014 | Weeldreyer et al. | |
| 2002/0010743 A1* | 1/2002 | Ryan | G06F 40/18 709/205 |
| 2002/0199001 A1* | 12/2002 | Wenocur | H04L 63/0428 709/227 |
| 2005/0015451 A1* | 1/2005 | Sheldon | H04L 51/28 709/206 |
| 2006/0026535 A1 | 2/2006 | Hotelling et al. | |
| 2006/0137007 A1* | 6/2006 | Paatero | G06F 21/629 726/22 |
| 2006/0195781 A1* | 8/2006 | Jatavallabha | G06Q 10/10 715/208 |
| 2006/0259524 A1 | 11/2006 | Horton | |
| 2007/0118598 A1 | 5/2007 | Bedi et al. | |
| 2008/0114847 A1* | 5/2008 | Ma | G06Q 50/184 709/206 |
| 2008/0278740 A1* | 11/2008 | Bird | H04L 69/24 358/1.15 |
| 2009/0307315 A1* | 12/2009 | Murphy, Jr. | G06Q 10/107 709/206 |
| 2010/0036917 A1* | 2/2010 | McCaffrey | G06Q 10/107 709/206 |
| 2010/0131835 A1 | 5/2010 | Kumar et al. | |
| 2010/0161540 A1 | 6/2010 | Anisimov et al. | |
| 2011/0264705 A1 | 10/2011 | Diamond | |
| 2012/0089950 A1 | 4/2012 | Tseng | |
| 2012/0266159 A1 | 10/2012 | Risbood et al. | |
| 2013/0227420 A1 | 8/2013 | Pasquero et al. | |
| 2013/0244690 A1 | 9/2013 | Huang et al. | |
| 2014/0173423 A1* | 6/2014 | Meisels | G06Q 10/107 715/255 |
| 2014/0173530 A1 | 6/2014 | Mesguich Havilio et al. | |
| 2014/0196022 A1 | 6/2014 | Skutin et al. | |

OTHER PUBLICATIONS

Non-final Office action in U.S. Appl. No. 14/861,160, dated Nov. 30, 2017, 11 pages.
Wroblewski, Touch Gesture Reference Guide, Apr. 19, 2010, web page printout.
ClickDesk, Live Chat, Video & VOIP, Helpdesk in one system, Aug. 6, 2014, web page printout.
Olark, Everything You Need to Make Customers Happy, Aug. 6, 2014, web page printout.
Olark, Targeted Chat, Aug. 6, 2014, web page printout.
Various contributors, Real user monitoring, (Wikipedia, Creative Commons), Sep. 9, 2014.
Google Support, Urchin Tracking Module (UTM), Sep. 17, 2015, web page printout.
AppsBuilder SpA, The All-in-One Tool, Nov. 15, 2015, web page printout.
SmartBear Software, Inc., AlertSite UXM What is Real-User Monitoring?, Sep. 9, 2014, web page printout.
Live Chat, For Customers—Chat Always available for your clients, Aug. 6, 2014, web page printout.
Zopim, Zopim Live Chat Features—Build Meaningful relationships, right on your website, Aug. 6, 2014, web site printout.
Guay, Matthew, Editorially—A Brilliant Markdown Collaborate Writing and Editing App, Jul. 19, 2013, web page printout.
Cholling, Charles C. et al., Natural language programming, (Wikipedia, Creative Commons), Nov. 24, 2014.
Viticci, Federico, Our Favorite Markdown Writing App for the iPhone, The Sweet Setup (Blanc Media, LLC), Feb. 4, 2015, web page printout.
Office Action dated Oct. 2, 2018 in U.S. Appl. No. 15/288,002, Inventor Bharath Sridhar.

\* cited by examiner

EMAIL INTERFACE FOR APPLICATION CREATION AND MANAGEMENT

FIELD OF THE INVENTION

The present disclosure relates generally to creating and using applications, and more particularly to methods and systems for creating, managing, and using applications using simple commands in a messaging environment.

BACKGROUND

Applications are typically created in special purpose applications and programming languages usually requiring specialized knowledge and computer-programming expertise. Exemplary languages include C, C++, C#, Java, JavaScript, and SQL. Some languages are pre-compiled, e.g., C, while others are interpreted during execution, e.g., JavaScript. Applications providing data analysis are becoming increasingly popular as data relating to on-line activities such as shopping and media consumption are collected. Data mining and analysis, however, is typically the province of users having programming and data analysis expertise. Ordinary users not having such skills but nevertheless desiring to engage in meaningful data analysis therefore face daunting challenges. Applications may be hosted in a cloud environment, installed locally on a computer or handheld device, and processing may be divided between cloud and local environments.

BRIEF DESCRIPTION OF THE DRAWINGS

The subject matter presented herein is illustrated by way of example and not by way of limitation in the figures of the accompanying drawings, in which like reference numerals refer to similar elements and in which.

DETAILED DESCRIPTION

Figure 1:
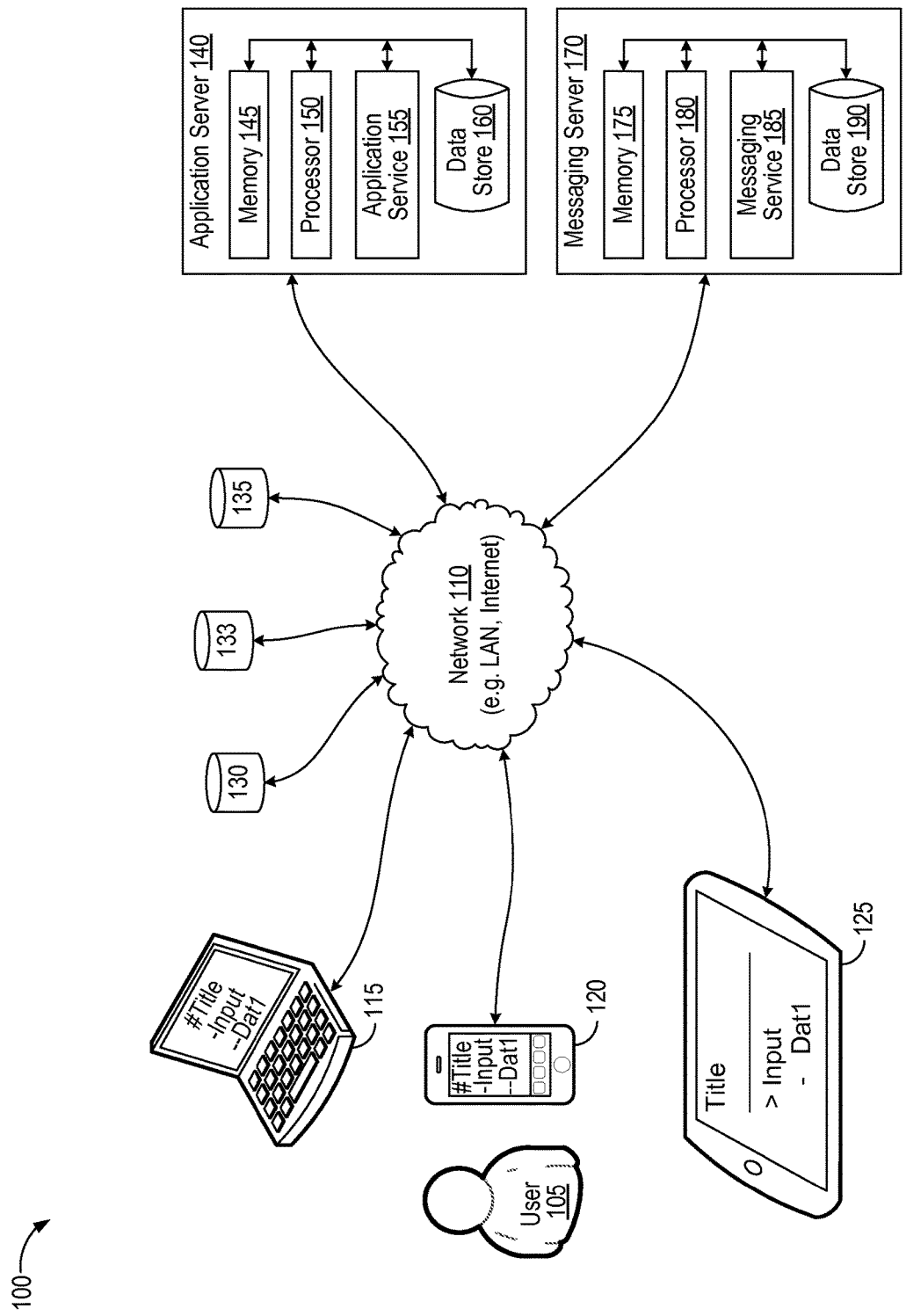
FIG. 1 depicts a system for producing an application in accordance with one embodiment.

FIG. 1 depicts a system 100 for creating, modifying, and using an application in accordance with one embodiment. System 100 enables an ordinary user to create, modify, and use, via a simple text-based email interface or a mobile application, applications capable of retrieving data from disparate sources, performing analyses, and producing informative, actionable reports.

Exemplary applications include event registrations, and data mining analysis, for example, reports indicating potential revenues according to sales prospects, sales upsells, and user churn. System 100 accesses data sources 130, 133, and 135 via a network 110. The data sources are accessed to provide input-data variables that are applied to functions by the applications. Exemplary devices include laptop computer 115, wireless handheld mobile device 120, and wireless handheld tablet 125. Some devices, e.g., a mobile digital device such as an iPhone® available from Apple, Inc. of Cupertino, Calif., may be characterized as small-screen devices. These devices are employed by one or more users, e.g., user 105, to create, modify, and, use an application using simple commands. For example, user 105, desiring to create an application to receive registration information for an event, enters an application specification comprising an input variable and a function, e.g., as depicted on device 120 in FIG. 1. Items entered in an application specification, e.g., the input variable and function, are referred to as specification elements. An application specification may include zero or more specification elements. Device 120, in this example, a small-screen wireless handheld device, transmits a message, also referred to as a communication, including the application specification to a messaging server 170, and including a list of zero or more recipients with whom user 105, a sender, desires to collaborate.

Messaging server 170 includes a software service, messaging service 185 that receives the communication and forwards it to application service 155, also a software service, included in application server 140. Messaging server 170 receives the communication in a number of formats capable of expressing a specification textually, e.g., plain text or HTML, including, e.g., e-mail, SMS, and text message in accordance with one embodiment. Service 155 parses the message, effectively determining the application specification, determines whether the message includes at least an input-data variable and a function (thereby identifying a missing requirement), and produces and saves an application, here, an application for receiving registration information for an event. Service 155 has thus produced an application product, here, an application, by receiving a communication, determining an application specification from the communication, processing the application specification, and producing the application product. Service 155 produces the application on a best-effort basis. Accordingly, an application may be created in the presence of one or more application specification errors, including fatal errors, zero or more erroneous commands, and may be created as a partial or blank application specification. Service 155 determines whether the application specification is in a "done" condition. In response to determining the specification is not in a "done" condition, application service 155 revises it, transmits the revised application specification to the sender, e.g., user 105, and zero or more recipients that may be specified in the communication, and iterates until the specification is in a "done" condition. A specification is in a "done" condition when it includes no errors, or when it includes an express command, e.g., "!!!" indicating done. Application service 155 stamps the specification with a version indicator in one embodiment. "Stamping" the application specification includes including the version indicator in the specification, or in a separate message or associating the indicator with the specification separately, e.g., in a database or a computer file. In revising the application specification, application service 155 identifies errors, thereby advantageously enabling the sender to make corrections. Application service 155 introduces suggestions for improvements into the specification and returns to the sender, e.g., application functionality suggestions, model development, references to third party data sources, work flow suggestions, and suggesting data analysis functions backed by modules supported by service 155, in accordance with another embodiment. A "done" condition expressed in a command, e.g., "!!!" unconditionally terminates iteration, even if the application specification includes errors.

Service 155 also establishes user accounts and application access privileges for user 105 and the recipients, and transmits the application to user 105 and the zero or more recipients. Service 155 transmits information for accessing the application, e.g., a URL identifying a location containing the application, to user 105 and the zero or more recipients in accordance with another embodiment. User 105 has thus created an application for receiving event registration information using simple text commands in a messaging environment, established collaboration with the recipients, and did so on a small-screen wireless handheld mobile device.

Application and messaging servers 140 and 170 respectively comprise application and messaging services (155, 185), memory (145, 175), processor (150, 180), and storage (160, 190), in one embodiment. Messaging service 185 receives email, and associates messages it receives at certain addresses, e.g., createreg@zohoapp.com, user007@zohoapp.com, with application creation. It forwards these messages to application service 155, which creates and modifies an application based on the message, and manages user access to the application. In another embodiment, messaging service 185 receives messages via other protocols, e.g., short message service ("SMS"), and forwards them to application service 155. In another embodiment, application server 140 receives messages directly.

Figure 2:
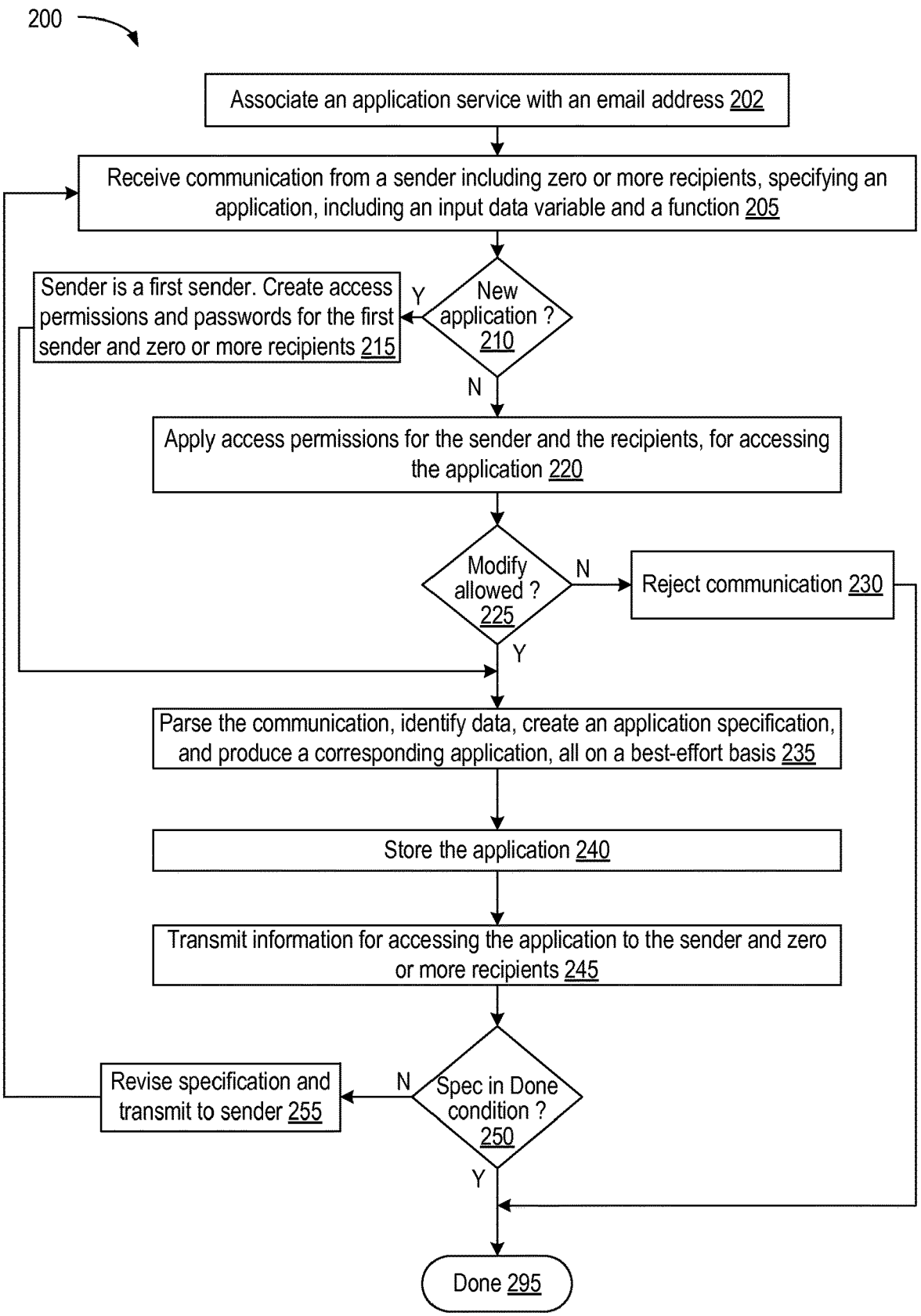
FIG. 2 is a flowchart depicting a computer-implemented method for creating, modifying, and using an application in accordance with one embodiment.

FIG. 2 is a flowchart depicting a computer-implemented method for creating, modifying, and using an application in accordance with one embodiment. The method advantageously supports any combination of creating, modifying, and using an application. Thus, an application may be created, or modified, or used. In another aspect, an application may be created and modified, or created and used, or modified and used. At step 205, the method receives a communication, e.g., to application service 155 or messaging service 185, including a first communication from a sender, e.g., a first email message, including a first sender, the message identifying zero or more recipients. In one embodiment, the method receives the first communication via text message, SMS, or email. The sender and zero or more recipients may be identified by, e.g., an email or SMS address. The communication includes an application specification including zero or more input-data variables and zero or more functions. A function determines how input-data variables will be processed by application service 155 when the application is run by an application user. In one embodiment, the application specification is comprised of plain text. In another embodiment, the application specification is comprised of hypertext markup language (HTML).

The method next determines, in step 210, whether the application is new. In one embodiment, the communication includes a link to an existing application, and no link if the application is new. In another embodiment, the communication includes an application identifier, e.g., an application name or I.D. If the method at step 210 determines the application is new, it names and creates an application, creates access permissions to the application for the sender and zero or more recipients, thereby enabling collaboration, and branches to step 235 for further processing, described below. In one embodiment, access permissions include creating a user account and password corresponding to a messaging, e.g., email, address for the sender if a user account does not yet exist. If the method, in step 210, determines the application is not new, it branches to step 220 and compares the application's access permissions to the sender and recipients identified in the communication. If the access permissions prohibit the sender from modifying the application (225), the method rejects the communication at step 230, branches to step 295, and is done. If modification is not prohibited, then processing continues at step 235.

The method at step 235 parses the communication, determines the application specification, identifies data, and produces an application, e.g., via application service 155. "Produces" includes creating and modifying an application. Notably, if the application specification includes fatal errors, as might occur in the case of an unconditional done command ("!!!"), application service 155 creates an application specification, and an application corresponding to the application specification, on a best-effort basis, even if the application specification it creates is blank. Details relating to applying an application to data are described with respect to FIGS. 4-5 below. The method stores the application, e.g., in data store 160, at step 240, and at step 245, transmits information for accessing the application to the sender and to the zero or more recipients. The method transmits, e.g., via a second email message, the determined application specification and the revised application specification used in creating the application, to the first sender, and to zero or more recipients, in one embodiment. The method stamps the revised specification with a version indicator in accordance with another embodiment. The version indicator relating to the application specification is tracked and maintained along with a mapping to the corresponding application version. "Transmits" includes transmitting information for accessing the application to the first sender and to zero or more recipients, or transmitting a message including a link to an application, e.g., a uniform resource locator (URL) or other link identifying a location, e.g., data store 160, corresponding to the application. Information for accessing the application includes the application or a link identifying its location, account information, e.g., user name, password, and information identifying the application, e.g., an application I.D. or name.

At step 250, the method determines whether the application specification is in a "done" condition. An application specification is "done" if expressly so indicated in an "unconditional done" command, e.g., "!!!" or if the specification contains no errors. A specification error is one that cannot be corrected by application service 155, e.g., as in the case of an erroneous command. An erroneous command includes, e.g., a misspelling, an erroneous parameter, or the non-existence of an input-data variable or function. If the application specification is not in a "done" condition, the method transitions to step 255, revises the application specification, and transmits it to the sender. In revising the application specification, the method identifies errors and suggests corrections, thereby advantageously enabling the sender to produce an error-free specification. For example, if the method detects an error comprising a non-existence of an input-data variable or function, e.g., the application specification is blank, it creates and transmits to the sender a specification including, e.g., suggestions for application model development, data source locations, work flow development, e.g., sequences and operations for processing data available to application service 155. The transmission may also identify data processing functions and standard applications, related directives and parameters. This enables a user, e.g., the sender, to conveniently obtain application specification instructions simply by transmitting a blank message to, e.g., application service 155. In another embodiment, the method returns a text-based template including application functions and input-data variable placeholders. In another embodiment, the method creates and transmits a specification, applying as many functions as are correct, and including error messages pertaining to erroneous commands. In another embodiment, the method attempts to correct and apply erroneous commands. Notably, in the case of a blank specification, "applying zero or more commands" implies creating a blank application specification and transmitting it to the sender, e.g., one containing instructions explaining how to create an application specification. The method also introduces suggestions for improvements in work flow, e.g., recommended input variable data sources and functions, thereby advantageously assisting the user to produce an efficient and useful application. In one embodiment, the method stamps the specification with a version indicator. The method iterates until the application specification includes no errors, or includes an unconditional "done" command, e.g., "!!!". The iterating includes transmitting the revised application specification to the first sender and to zero or more recipients. Upon detecting a "done" condition in the application specification, the method at step 250 transitions to step 295, and is done.

Figure 3:
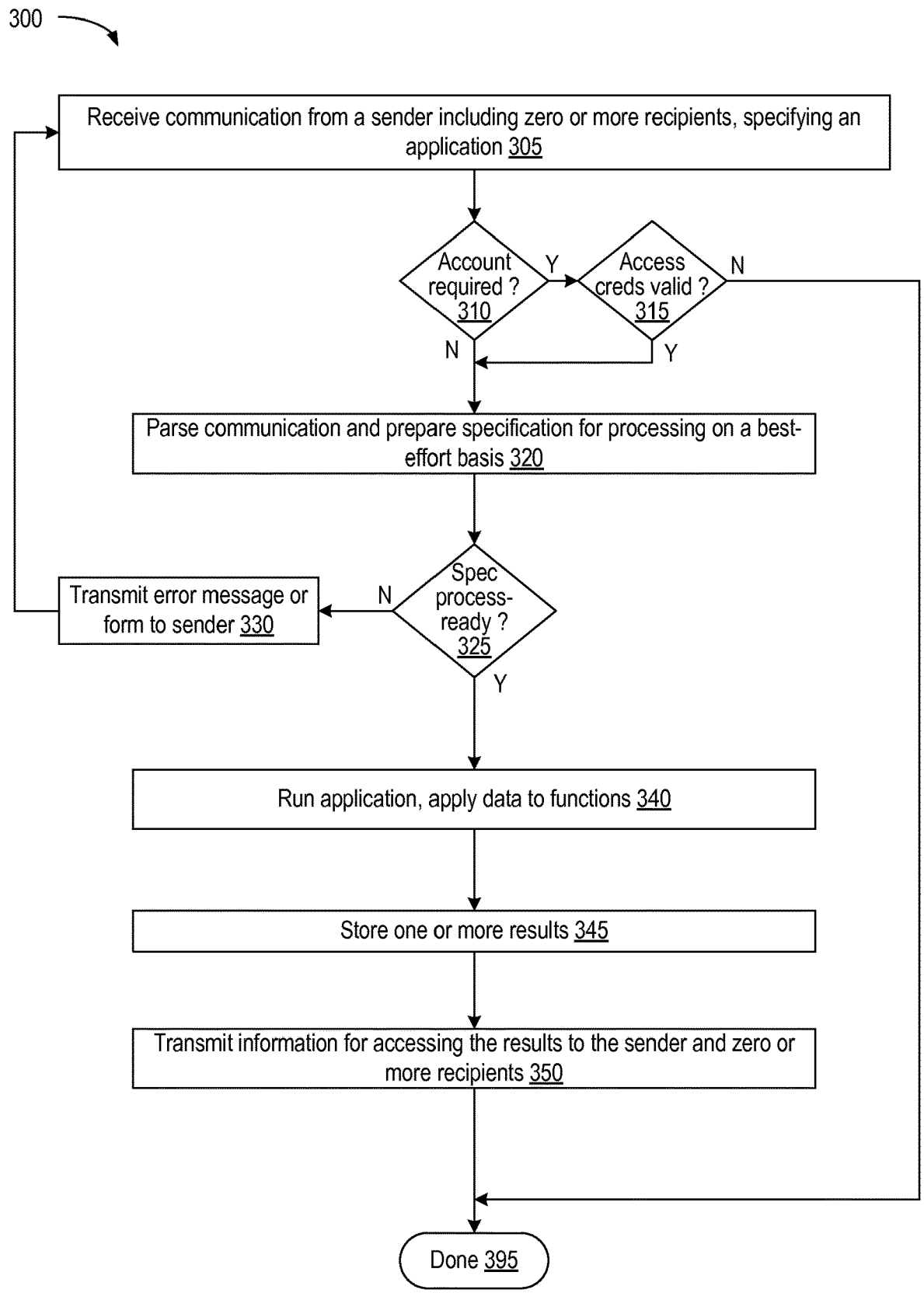
FIG. 3 is a flowchart depicting a computer-implemented method for creating, modifying, and using an application in accordance with one embodiment.

FIG. 3 is a flowchart depicting a computer-implemented method for creating, modifying, and using an application in accordance with one embodiment. As described above with respect to FIG. 2, the method advantageously supports any combination of creating, modifying, and using an application. Thus, an application may be created, or modified, or used. In another aspect, an application may be created and modified, or created and used, or modified and used. The flow and steps for using an application are similar to those described with respect to creating and modifying an application. In all cases (creating, modifying, and using), the method receives a communication that includes an application specification. The method determines and processes the application specification, and produces an "application product." In the creating and modifying cases, the application product is the application itself. In the using case, the application product is one or more results (outputs), produced by running the application. At step 305, the method receives a communication, e.g., by application service 155 or messaging service 185, from a sender, e.g., a user entitled to use the application as described with respect to FIG. 6. In one embodiment, the method receives the first communication via text message, SMS, or email. The communication includes an application I.D. corresponding to the application the user wishes to use, and may include user access credentials. The method establishes communication via APIs between application service 155 and messaging server 185 to handle receiving communications from the sender, processing an application specification, running an application, and transmitting application output to the sender, in accordance with one embodiment.

In step 310, the method determines whether the application I.D. corresponds to an application requiring the sender to have access credentials as a condition to accessing the application. If so, and if the access credentials are either not present or invalid as determined in step 315, control passes to step 395 and the method ends. Otherwise, the method parses the communication in step 320 to determine whether it includes a specification in a condition ready for processing. If not, the method makes a best-effort attempt to interpret the sender's communication and prepare a specification. If the effort does not succeed, and the specification is not "process-ready" as determined in step 325, the method at step 330 transmits an error message to the sender. The message includes the "best-effort" specification prepared by the method, and may additionally include workflow and other suggestions, including a list of standard applications and functions, and related parameters. In another aspect, the method returns a text or HTML form to the sender with input fields, e.g., highlighted or in curly "{ }" brackets along with input suggestions. This form is used in another embodiment, in the event the sender attempts to invoke an application with a blank specification.

If the best-effort attempt succeeds, as determined in step 325, the method runs the application in step 340, stores any results in step 345, and transmits the results in step 350 to the sender. Transmitting includes communicating results to a sender via, e.g., email, text message or SMS, and also includes including one or more links to the results, e.g., one or more URLs identifying locations containing the results. The method next proceeds to step 395, and is done.

The method described with respect to FIG. 3 may also be implemented via a user application, e.g., a "mobile app" running on a mobile digital device such as an iPhone® available from Apple, Inc. of Cupertino, Calif. A user interface (UI) in the user application may prompt the user (sender) for account credentials, thereby streamlining processing relating to steps 310 and 315. Moreover, a suite of available applications can be transmitted to the UI via, e.g., API interaction between the user application and the application service, e.g., service 155. The application service, through API interaction, prompts the user (sender) on the UI for appropriate inputs and selections, qualifies user inputs, runs the application, and stores output produced by the application, thereby effectuating method steps 320-345. The application service transmits the output, or a link to it, on the UI, thereby completing step 350 before concluding processing at step 395.

Figure 4:
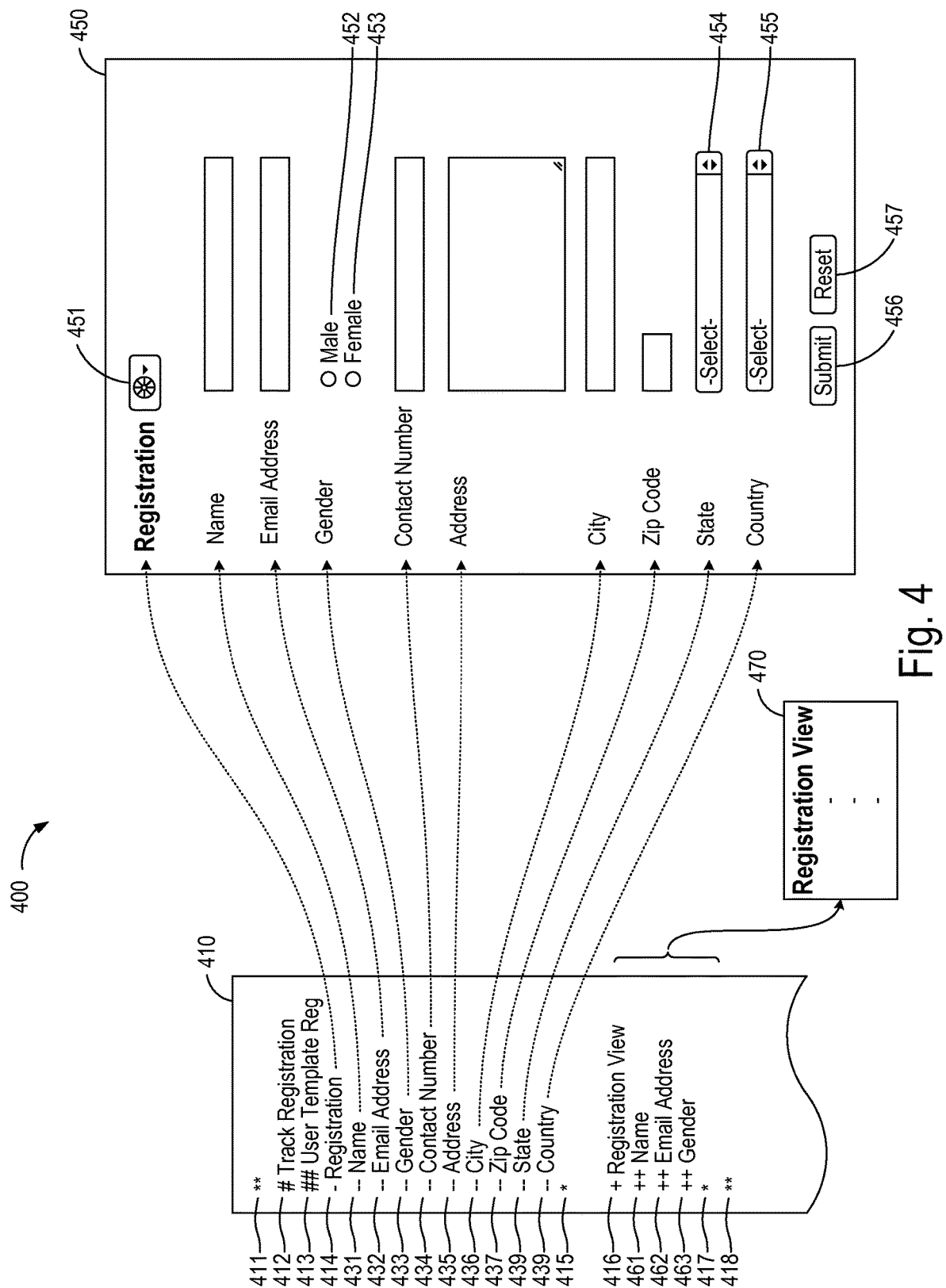
FIG. 4 depicts exemplary commands for producing an application and a corresponding input form in accordance with one embodiment.
Figure 5:
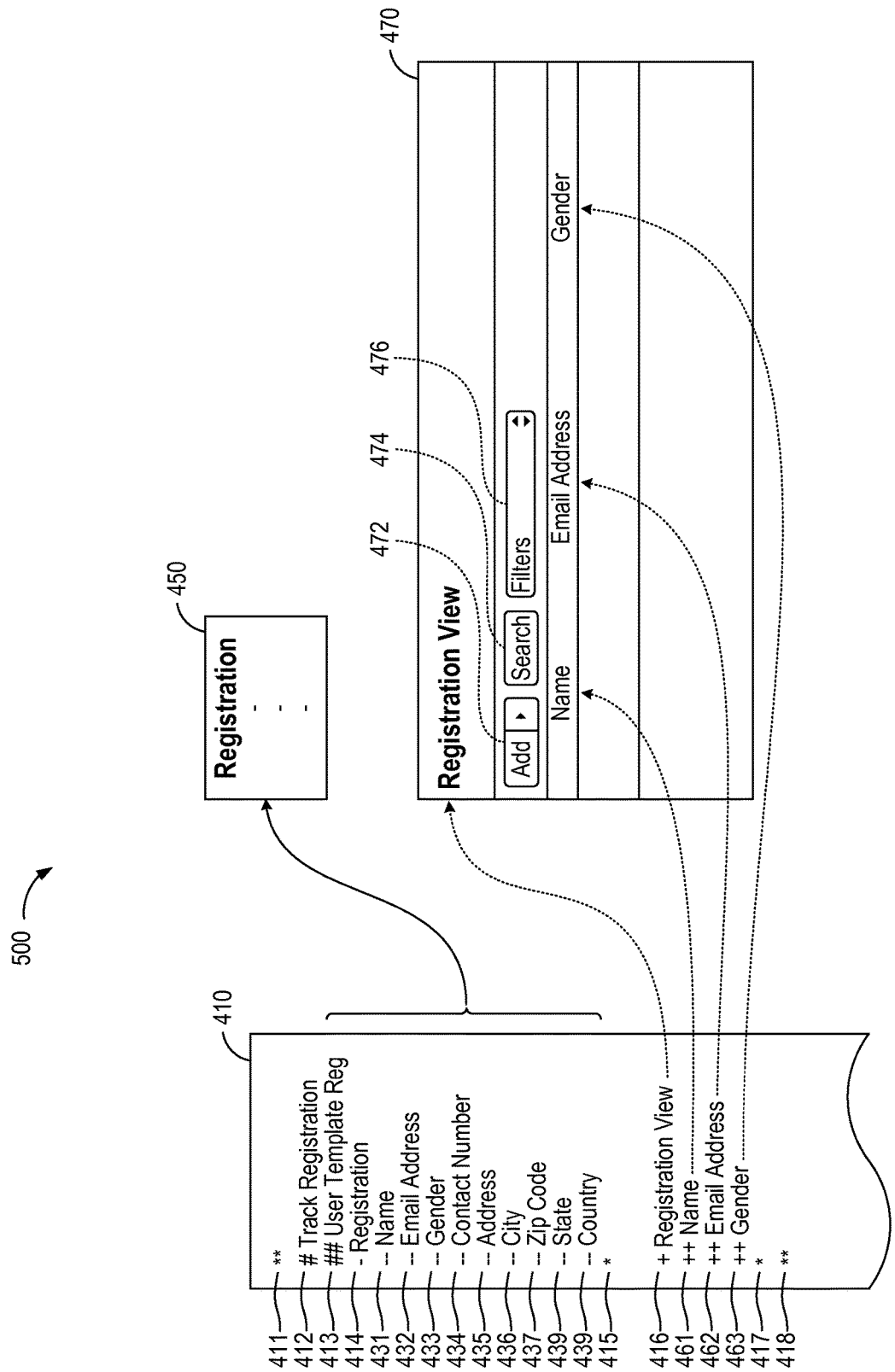
FIG. 5 depicts exemplary commands for producing an application and a corresponding output form in accordance with one embodiment.

FIGS. 4 and 5 depict an exemplary application specification 410 for receiving attendee registrations to events. Specification 410, also referred to as message 410, is received in a communication from a sender. The specification includes an input-data section that when processed by an application service, e.g., application service 155, produces an input form 450 (FIG. 4), and an output data section that when processed by the application service, produces an output form 470 (FIG. 5). The specification includes directives 411-418 for structuring input form 450 having several input-data variables, here, name 431, email address 432, gender 433, and variables 434-439. For simplicity of depiction, message 410 depicts only input-data variables and functions, and omits sender and recipient identities, and other information, e.g., application identifying information. In one embodiment, application commands and content comprise a single item, e.g., input-data variables only, or functions only. In another embodiment, input-data variables and functions comprise zero items, e.g., blank.

Directives 411 and 418, "" (double asterisk), respectively signal beginning and ending points of application specification 410. A directive, "##" (double pound), followed by a parameter or keyword, specifies a user interface template, a convenient and concise way of specifying style, formatting, controls and data for input and output forms. For example, "## User Template Reg" 413 specifies the size, shape, and style of forms 450 and 470, locations and functions corresponding to settings control 451, gender (Male/Female) radio buttons 452 and 453, State and Country drop-down menus 454 and 455, Submit and Reset buttons 456 and 457, Add 472, Search 474, Filter drop-down 476, input and output-data variable (431-439) field locations, data types, button locations, font types, labels, styles, and other attributes corresponding to input and output forms 450 (FIG. 4) and 470 (FIG. 5). In accordance with another embodiment, user interface template directive 413 may be specified as a link to a template, e.g., a URL: http://www.zohoapps.com/apptemplates/UserTemplateReg.hmtl. Application specification 410 includes input and output data sections, the first beginning with input title "-Registration" 414, signaling the beginning of an input-data section corresponding to form 450 (FIG. 4) and ending with directive 415** "*"; the second beginning with output title "-Registration View" 416 signaling the beginning of an output-data section corresponding to form 470 (FIG. 5) and ending with directive 417 "*" (single asterisk).

Application specification 410 includes input-data values 431-439 (Name—Country as depicted in FIGS. 4 and 5). Application service 155 processes specification 410, and in further accordance with directives provided by user interface template 413 "User Template Reg," e.g., style, formatting, data type specifications, produces an application that when activated, provides registration input form 450 (FIG. 4) to a user, here, an event registrant. Application service 155 enables the user to activate the application by providing the user with an icon or link to the application. In the exemplary depiction in FIG. 4, a one-for-one correspondence exists between "Registration" title 414 and the bold "Registration" title appearing in the upper left corner of input form 450; also between input-data variables 431-439 (Name—Country) and identically titled labels appearing in front of corresponding data fields on form 450.

Application specification 410 also includes output data values 461-463 (Name—Email Address as depicted in FIGS. 4 and 5). Application service 155 process specification and, as above, in further accordance with directives provided by user interface template 413, produces an application that when executed, transmits to a permissioned user, output form 470 depicted in FIG. 5. The permissioned user is one having access permissions to the application, e.g., the sender who created the application specification, and a user to whom the sender has authorized access. In the exemplary depiction in FIG. 5, a one-for-one correspondence exists between output data variables 461-463 (Name—Country) and identically titled labels appearing in front of corresponding data fields on form 470. Separate input and output templates are specified in accordance with another embodiment. For example, "## User Template Reg2," when included in the output specification section, i.e., after asterisk ("*"), specifies a different appearance and values on output form 470, than the form depicted in FIG. 5.

An additional directive "###" for specifying standard applications and functions is included in the application specification in accordance with one embodiment. A standard function may be created and used for any purpose. Typically, a standard function conveniently packages functionality that users are likely to repeatedly desire. For example, a function referenced in an application specification as "### SalesConversions" provides a report detailing sales conversions of visitors to websites according to time spent browsing, and number of interactive chat sessions, in accordance with one embodiment. SalesConversions retrieves data from one or more customer relationship management ("CRM") databases, identified by, e.g., links built-in to the function, and prepares and delivers a report according to built-in parameters, e.g., time spent browsing and interactive chat sessions. A user specifies additional or replacement function parameters in accordance with another embodiment, via input-data variables specified in the application specification. So for example, a user may direct SalesConversions to use a particular CRM database by specifying, e.g., "-CRM: http://www.zohoCRM.com/NA" designating a North American segment of a CRM database. In another aspect, SalesConversions is directed to additionally report abandoned shopping carts by specifying an input input-data variable, e.g., "-SalesConversions: AbandonedCarts." Output formatting is similarly customized using output-data variables. As described above, a user, e.g., the sender, may conveniently obtain standard application and function information, related directives and parameters, along with specification instructions, merely by transmitting a blank message to, e.g., application service 155.

Figure 6:
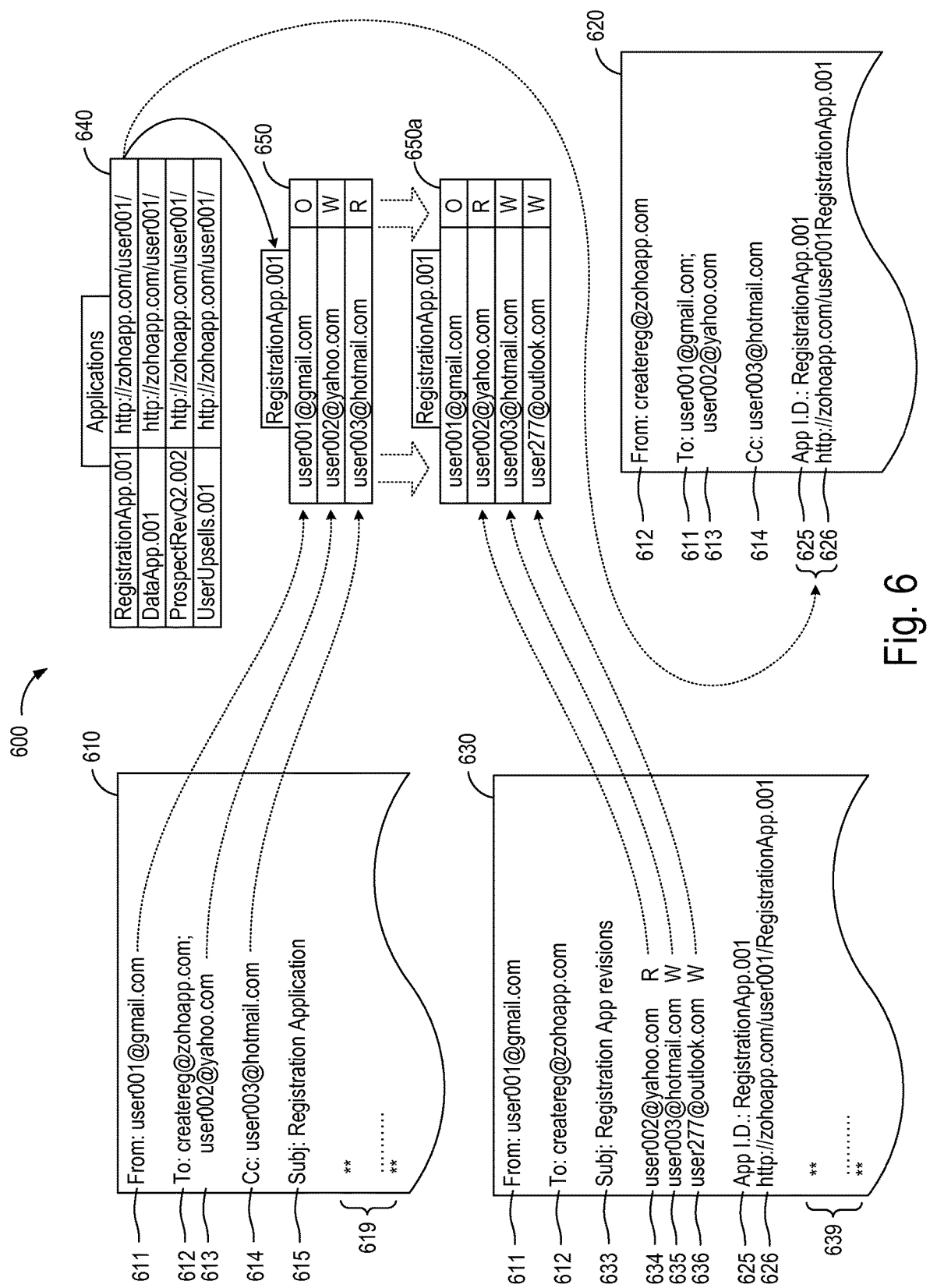
FIG. 6 depicts a data structure for assigning application access privileges in one embodiment.

FIG. 6 depicts a data structure for assigning application access privileges in one embodiment. The data structure is used by application service 155 to create and maintain user access permissions, thereby enabling user 105 to conveniently include collaborators in creating and modifying an application. Application service 155 receives a communication 610 specifying a sender and zero or more recipients respectively corresponding to zero or more collaborators identified in one or more address fields, e.g., "To:," "Cc:," and "Bcc:" of the communication, the one or more address fields corresponding to one or more application access privileges. In one embodiment, message 610 is an email directed to a dedicated recipient 612, createreg@zohoapp.com, identified in the "To:" header field of the message. Dedicated recipient 612 is used, e.g., to direct message 610 to application service 155. In one embodiment, dedicated recipient 612 distinguishes the application type to be created. For example, a message directed to create@zohoapp.com signifies an event registration application, and a message directed to createsells@zohoapp.com signifies creation of an application to create reports corresponding to sales "upsells" for a product or service. In another embodiment, the application type to be created is distinguished within the message body, e.g., as described with respect to directive 412 above.

Returning to message 610, a sender 611, user001@gmail.com, is identified in the "From:" header field of message 610. Additional recipients, identified in either the "To:", "Cc:" or "Bcc:" fields, signify collaborators. If the application is new, e.g., message 610 does not include an application I.D. or name, service 155 creates an application I.D., RegistrationApp.001, assigns a location, http://zohoapp.com/user001, and enters them in application table 640. Service 155 creates permissions table 650 corresponding to application I.D. RegistrationApp.001, enters sender 611 (here, a first sender) user001@gmail.com and a flag "O" designating sender 611 as the owner of the application. An owner inherently has authority to modify permissions table 650, and read/write ("W") permissions to the application, here, RegistrationApp.001.

In one embodiment, if the first sender does not have a user account, application server 155 creates one, e.g., user001@zohoapp.com, and a password. Service 155 may transmit a welcome message including account identity and password, to the first sender upon account creation in one embodiment. In another embodiment, a welcome message is included in a message relating to application creation. Advantageously, a sender may transmit a communication that includes an application specification to any of, e.g., createreg@zohoapp.com (to implicitly create an event registration application), createupsells@zohoapp.com (to implicitly create an application for reporting upsell sales data), or to the sender's account, e.g., user001@zohoapp.com, to create an application expressly identified in the application specification. Notably, irrespective of the account to which an application specification is directed, an express directive in an application specification to create or modify a particular application type overrides a type implied by a dedicated account. For example, user001@gmail.com transmits a communication to createupsells@zohoapp.com that includes an application specification containing a directive to create an application for creating sales prospect reports. Even though createupsell@zohoapp.com will create, by default, an application for creating sales "upsell" reports, the express directive to create an application for creating sales prospect reports in user001's communication overrides the default (implied upsell application), and application service 155 will create an application for creating sales prospect reports. In another embodiment, application service 155 creates an account for a new user on messaging server 175, e.g., user888@zohomail.com, and recognizes that address for creating applications. Thus, the new user, e.g., user008@yahoo.com, may send a message to user888@zohomail.com to create and modify an application. Application service 155 therefore supports a plurality of user accounts, and processes messages for a plurality of application types in the user accounts.

Service 155 identifies recipient 613, user002@yahoo.com, in the "To:" field of the message header, stores it in permissions table 650, and assigns recipient 613 read/write ("W") permission. Because recipient 614, user003@hotmail.com, is in the "Cc:" field of the message header, service 155 assigns recipient 614 read-only ("R") permission in permissions table 650. In another embodiment, recipients appearing in the "To:" and "Cc:" fields are respectively assigned "R" and "W" permissions. Subject line 615 is for human readability and is ignored. Application specification commands 619 are processed as explained above. In another embodiment, message 610 includes express access permissions, e.g., 634-636 as depicted in message 630.

Service 155 transmits message 620 to first sender 611 and recipients 613-614 including a link to application location 626 (http://zohoapp.com/user001/RegistrationApp.001), and application I.D. 625 (RegistrationApp.001), which it retrieved from application table 640. First sender 611 and recipients 613-614 may open the application via the link. In one embodiment, message 620 is directed to recipients 613 and 614 in the "To:" and "Cc:" fields of message 620, in accordance with their respective locations in the header of message 610.

Message 630, received from first sender 611, user001@gmail.com, includes application commands 639 for modifying application RegistrationApp.001. Subject 633 is for human readability and is ignored. Message 630 also includes instructions to modify access permissions to RegistrationApp.001. Permissions table 650 depicts user002@yahoo.com having "W" (read/write) permissions and user003@hotmail.com having "R" (read-only) permissions. Applying instructions 634-636, service 155 modifies access permissions in permissions table 650, depicted in its post-modification state as table 650a, as follows: user001@gmail.com is unmodified, user002@yahoo.com is modified from "W" to "R," user003@hotmail.com is modified from "R" to "W," and user277@outlook.com is added with access permission "W." In another embodiment, service 155 effectuates the same modifications to RegistrationApp.001 accesspermissions by processing a message having user002@yahoo.com in the "Cc:" field, and user003@hotmail.com and user277@outlook.com in the "To:" field of the message header.

In one embodiment, the application service returns an application specification to a sender including fields enclosed within curly "{ }" brackets, prompting the sender to enter information. Application service 155 may fill or add content relating to the information within the curly brackets, e.g., data retrieved from, e.g., data sources 130, 133, and 135. Application service 155 may insert the content directly, or insert a link referencing the content, e.g., a URL. The sender attaches content, or a link to it, e.g., a URL, in the application specification, and application service 155 parses and includes the content in the application it creates on behalf of the sender (creator) of the application.

Application service 155 enhances collaboration among users in another embodiment by identifying and highlighting edits and comments, and enabling the sender (an application creator or collaborator) to accept and reject edits. Application service 155 thereby tracks and associates one or more updates, e.g., edits and comments, to an application specification, with a sender. In another embodiment, a system and method for creating an application are provided via a cloud-based email service in which users create and share an email message comprising the application in a web browser or ordinary email interface. A user may share an email message including an application specification with collaborators, who have permissions to read and write to the specification in accordance with the permissions described with respect to FIG. 6. A specialized application specification editor is provided in another embodiment, in which application service 155 identifies and highlights edits and comments to the specification by one or more collaborators, and enabling the application creator (sender) to accept and reject edits. Read and write permissions as to collaborators are enforced in accordance with FIG. 6.

Application and messaging servers 140 and 170 depicted in FIG. 1 respectively comprise memory (145, 175), a processor (150, 180), and storage (160, 190). As one of skill in the art will appreciate, a device, e.g., a server, computer system, laptop computer, and wireless handheld device, may include one or more processors, memory and storage units, peripherals, and communication interfaces, any of which may communicate via, e.g., a system bus, network, or any other communication medium. A processor may be realized by a microprocessor, memory may include random access (RAM) and ready only (ROM) memory for storing and retrieving, e.g., information, instructions, and program modules for execution by the processor. A storage unit, e.g., 160 and 190 depicted in FIG. 1, may be fixed or removable, and may be realized by, e.g., hard disk, optical disk, solid state disk, and flash memory. The storage unit may store program modules, e.g., an operating system, application programs, system drivers and applications, e.g., a communication module, and data. Peripherals, e.g., input/output devices may include, e.g., keyboard, mouse, microphone, speaker, touch screen display, and motion sensors. A communication interface enables communication among devices over various wired and wireless networks, and may include, e.g., a modem, Ethernet or Network Interface Controller (NIC) card. Any device may be configured to function as a client or server device. Variations of the foregoing will be obvious to those of ordinary skill in the art.

Figure 7:
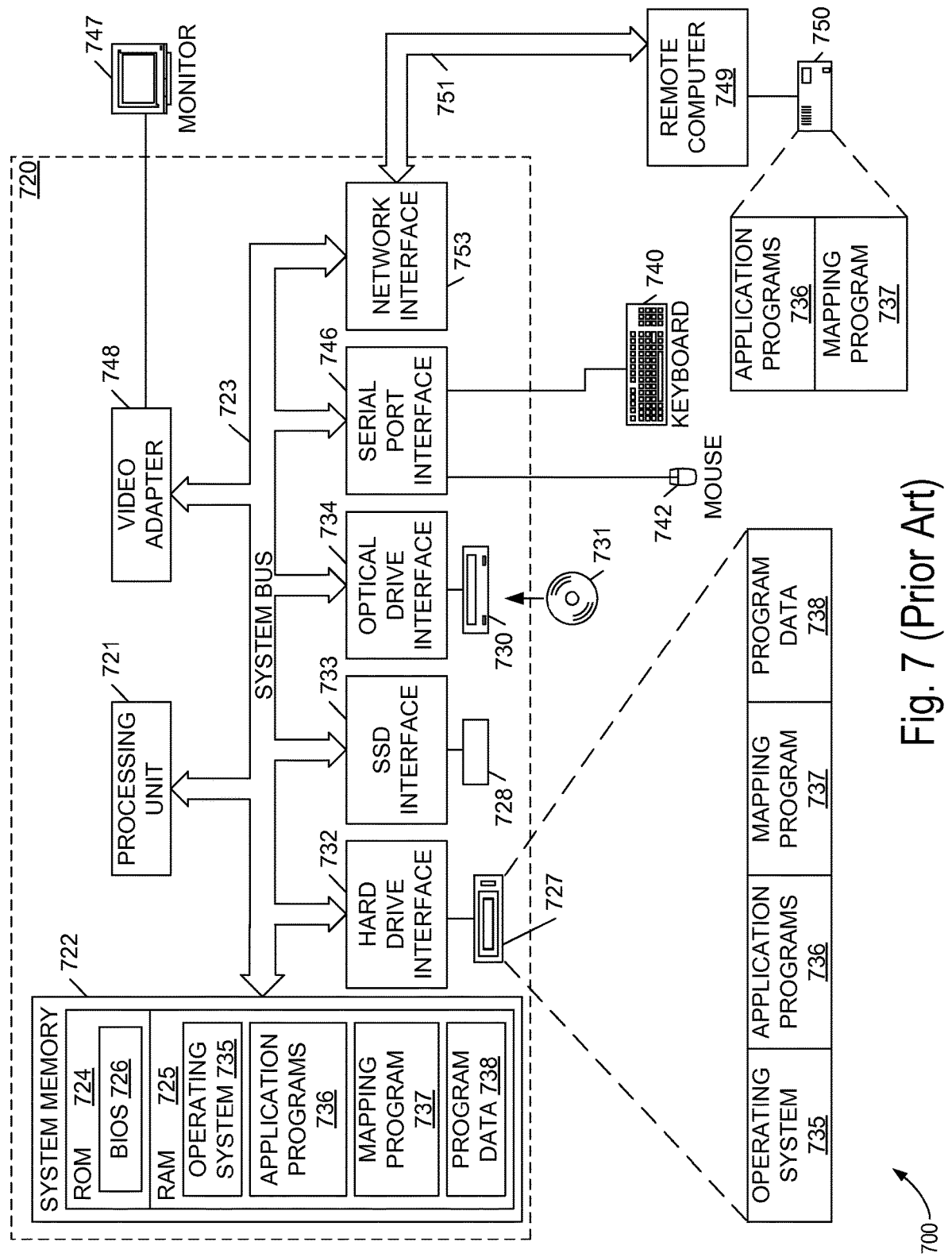
FIG. 7 depicts a suitable prior art computing environment in which the invention may be implemented.

FIG. 7 and the following discussion are intended to provide a brief, general description of a suitable computing environment in which the invention may be implemented. The foregoing examples are described in the general context of computer-executable instructions, such as program modules, executed on client and server computers linked through a communication network, including the Internet. Generally, program modules include routines, programs, objects, components, data structures, etc., that perform particular tasks or implement particular abstract data types. In a distributed computing environment, program modules may be located in both local and remote memory storage devices, and may be executed by client and server computers.

FIG. 7 depicts a general-purpose computing system 700 that can serve as a client or a server depending on the program modules and components included. One or more computers of the type depicted in computing system 700 can be configured to perform operations described with respect to FIGS. 1-6. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 700 includes a conventional computer 720, including a processing unit 721, a system memory 722, and a system bus 723 that couples various system components including the system memory to the processing unit 721. The system bus 723 may be any of several types of bus structures, including a memory bus or memory controller, a peripheral bus, and a local bus using any of a variety of bus architectures. The system memory includes read only memory (ROM) 724 and random access memory (RAM) 725. A basic input/output system 726 (BIOS), containing the basic routines that help to transfer information between elements within the computer 720, such as during start-up, is stored in ROM 724. The computer 720 further includes a hard disk drive 727 for reading from and writing to a hard disk, not shown, a solid-state drive 728 (e.g. NAND flash memory), and an optical disk drive 730 for reading from or writing to an optical disk 731 (e.g., a CD or DVD). The hard disk drive 727 and optical disk drive 730 are connected to the system bus 723 by a hard disk drive interface 732 and an optical drive interface 734, respectively. The drives and their associated computer-readable media provide nonvolatile storage of computer readable instructions, data structures, program modules and other data for computer 720. Other types of computer-readable media can be used.

A number of program modules may be stored on the hard disk, solid state disk 728, optical disk 731, ROM 724 or RAM 725, including an operating system 735, one or more application programs 736, other program modules 737, and program data 738. A user may enter commands and information into the computer 720 through input devices such as a keyboard 740 and pointing device 742. Other input devices (not shown) may include a microphone, joystick, game pad, satellite dish, scanner, or the like. These and other input devices are often connected to the processing unit 721 through a serial port interface 746 that is coupled to the system bus, but may be connected by other interfaces, such as a parallel port, game port or a universal serial bus (USB). A monitor 747 or other type of display device is also connected to the system bus 723 via an interface, such as a video adapter 748. In addition to the monitor, computers can include or be connected to other peripheral devices (not shown), such as speakers and printers.

The computer 720 may operate in a networked environment using logical connections to one or more remote computers, such as a remote computer 749. The remote computer 749 may be another computer, a server, a router, a network PC, a peer device or other common network node, and typically includes many or all of the elements described above relative to the computer 720, although only a memory storage device 750 has been illustrated in FIG. 7. The logical connections depicted in FIG. 7 include a network connection 751, which can support a local area network (LAN) and/or a wide area network (WAN). Such networking environments are commonplace in offices, enterprise-wide computer networks, intranets and the Internet.

Computer 720 includes a network interface 753 to communicate with remote computer 749 via network connection 751. In a networked environment, program modules depicted relative to the computer 720, or portions thereof, may be stored in the remote memory storage device. It will be appreciated that the network connections shown are exemplary and other means of establishing a communication link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. For example, the wireless handheld devices discussed above are "smart phones" that support many services in addition to conventional voice functions. Portable computing devices such as tablet computers, e.g., an iPad manufactured by Apple, Inc. of Cupertino, Calif., and palm-top and lap-top computers, can be equipped as detailed herein to serve as wireless handheld devices. Moreover, some components or devices are shown directly connected to one another while others are shown connected via intermediate components, or wirelessly, e.g., Wi-Fi, Bluetooth, a public WAN, e.g., the Internet, or a cellular network. In each instance, the method of interconnection establishes some desired electrical or logical communication between two or more devices, as will be understood by those of skill in the art.

Application server 140 and messaging server 170 may be realized as one or more servers, each including one or more services shown within application server 140 and messaging server 170, e.g., services 155 and 185. Application server 140 and messaging server 170 may also be implemented as discrete servers in which each includes a processor, memory, storage, and modules, self-contained within a server having discrete physical boundaries. In this embodiment, communications among the processor, memory, storage, and modules, occur internally. A discrete server may also be embodied virtually, e.g., via VMWARE, or VIRTUALBOX. Application server 140 and messaging server 170 may also be implemented in a distributed fashion, e.g., via a "hypervisor" implementation such as VMWARE, or as individual "cloud" services, in which processor, memory, and storage are not necessarily physically co-extensive. For example, processors 150 and 180 may be distributed across several physical processors communicating over a local area network. In such implementations, memories 145 and 175 may be physically separate from processors 150 and 180, and data stores 160 and 190, requiring communication over a potentially insecure communication link. Some embodiments therefore support secure communication links and data encryption for the communications into and out of application server 140 and messaging server 170. The components of servers 140 and 170 may be distributed across local and wide-area networks, including the Internet, as will be readily understood by those of skill in the art.

Variations of these embodiments, including embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. section 112(f).

What is claimed is:

1. A computer-implemented method for creating an application product, the method comprising:
receiving by an application service a first electronic communication from a first sender, the first electronic communication identifying zero or more recipients and including an application specification that indicates an application that the first sender desires to create;
parsing the first electronic communication by the application service to determine the application specification, the application specification including an input-data variable and a function, wherein the function determines how the input-data variable will be processed by the application service;
processing the application specification by the application service, wherein the processing comprises creating an application product that is new, such that the application product provides an output based upon an operation of the function on input data supplied by a user of the application product and the application product is not a modification of an existing application;
determining by the application service whether the application specification is in a done condition;
storing the application product;
transmitting information for accessing the application product to the first sender, and to the zero or more recipients; and
revising the application specification by the application service and transmitting the revised application specification to the sender if the application specification is not in a done condition, thereby creating the application.

2. The computer-implemented method of claim 1, wherein the receiving the first electronic communication is via e-mail.

3. The computer-implemented method of claim 1, the first electronic communication further comprising one or more address fields, the zero or more recipients identified in the one or more address fields, the one or more address fields corresponding to one or more application access privileges for the zero or more recipients.

4. The computer-implemented method of claim 1, further comprising transmitting to the first sender, information for creating an application product.

5. The computer-implemented method of claim 4, wherein the information for creating an application product includes a template.

6. The computer-implemented method of claim 1, further comprising iterating until the application specification is in a done condition.

7. The computer-implemented method of claim 1, further comprising transmitting the revised application specification to the zero or more recipients.

8. The computer-implemented method of claim 1, wherein revising the application specification further comprises stamping the application specification with a version indicator.

9. The computer-implemented method of claim 1, wherein the application specification includes zero or more erroneous commands, and revising the application specification includes identifying errors corresponding to the zero or more erroneous commands.

10. The computer-implemented method of claim 1, the method further comprising applying one or more access permissions to the application product corresponding to the first sender and the zero or more recipients.

11. The computer-implemented method of claim 10, further comprising receiving a second electronic communication from a second sender, wherein the access permissions prohibit the second sender from modifying the application product, and rejecting the second electronic communication.

12. The computer-implemented method of claim 10, further comprising receiving a second electronic communication from a second sender, the second electronic communication including one or more updates to the application specification, wherein the access permissions permit the second sender to modify the application product, and tracking and associating the one or more updates to the application specification with the second sender.

13. The computer-implemented method of claim 10, further comprising receiving a third electronic communication from the first sender, the third electronic communication including one or more instructions for modifying the access permissions, and in response to the one or more instructions, modifying the access permissions.

14. The computer-implemented method of claim 10, wherein the access permissions prohibit the zero or more recipients from modifying the application product.

15. The computer-implemented method of claim 10, wherein applying one or more access permissions further comprises creating a password.

16. The computer-implemented method of claim 1, wherein the application specification includes specification elements from the group consisting of directives, parameters, and commands.

17. A system comprising:
one or more computers configured to perform operations including:
receiving by an application service a first electronic communication from a first sender, the first electronic communication identifying zero or more recipients and including an application specification that indicates an application product that the first sender desires to create;
parsing the first electronic communication by the application service to determine an application specification, the application specification including an input-data variable and a function, wherein the function determines how the input-data variable will be processed by the application service;
processing the application specification by the application service, wherein the processing comprises creating an application product that is new, such that the application product provides an output based upon an operation of the function on input data supplied by a user of the application product and the application product is not a modification of an existing application;
determining by the application service whether the application specification is in a done condition;
storing the application product;
transmitting information for accessing the application product to the first sender, and to the zero or more recipients; and
revising the application specification by the application service and transmitting the revised application specification to the sender if the application specification is not in a done condition, thereby creating the application.

* * * * *